Feb. 7, 1939.  C. L. STEPHENS  2,146,237
PICTURE PROJECTING DEVICE
Filed Aug. 2, 1937  2 Sheets-Sheet 1
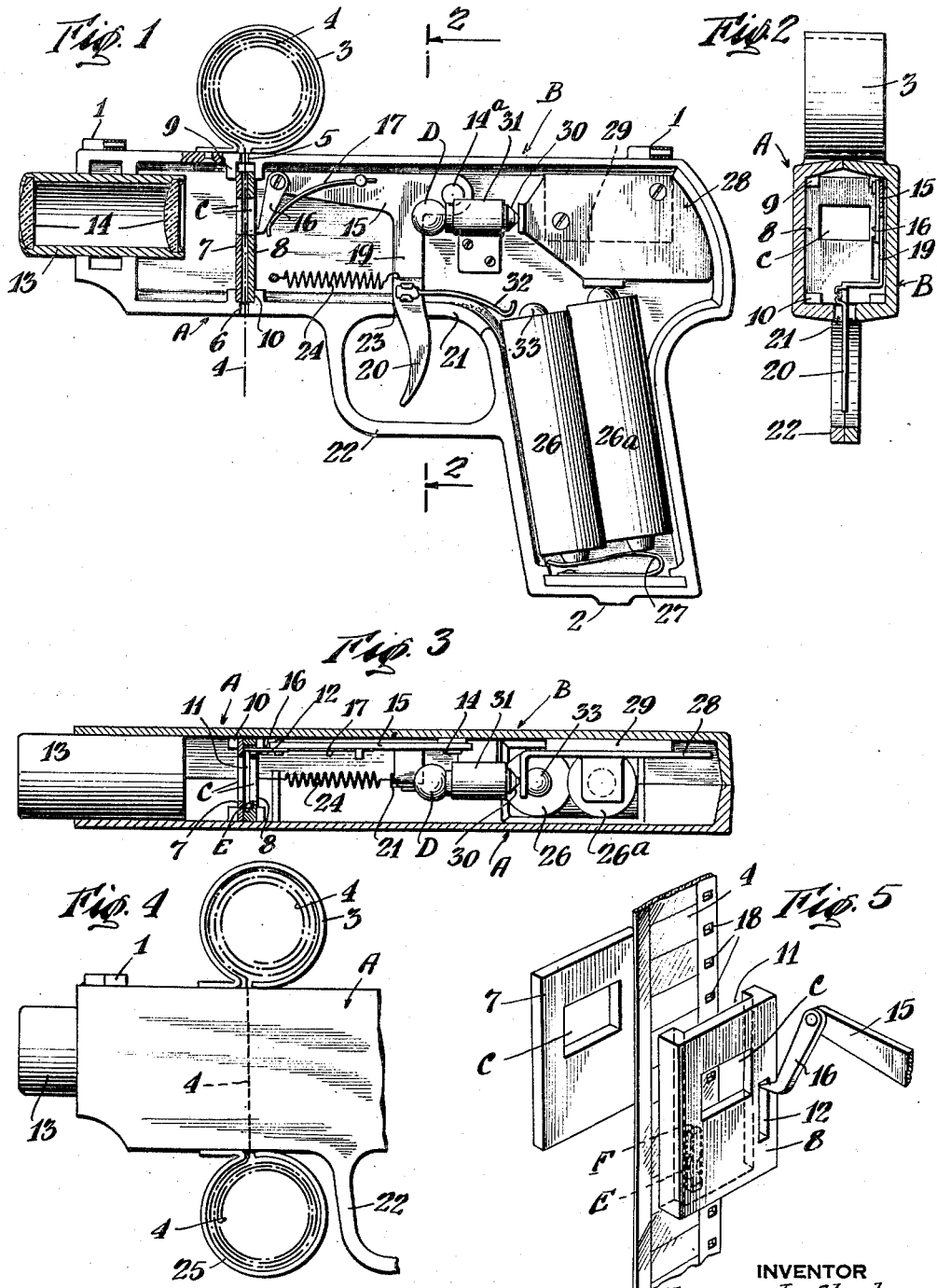
INVENTOR
Clarence L. Stephens
BY
Frederick J. Barker
ATTORNEY

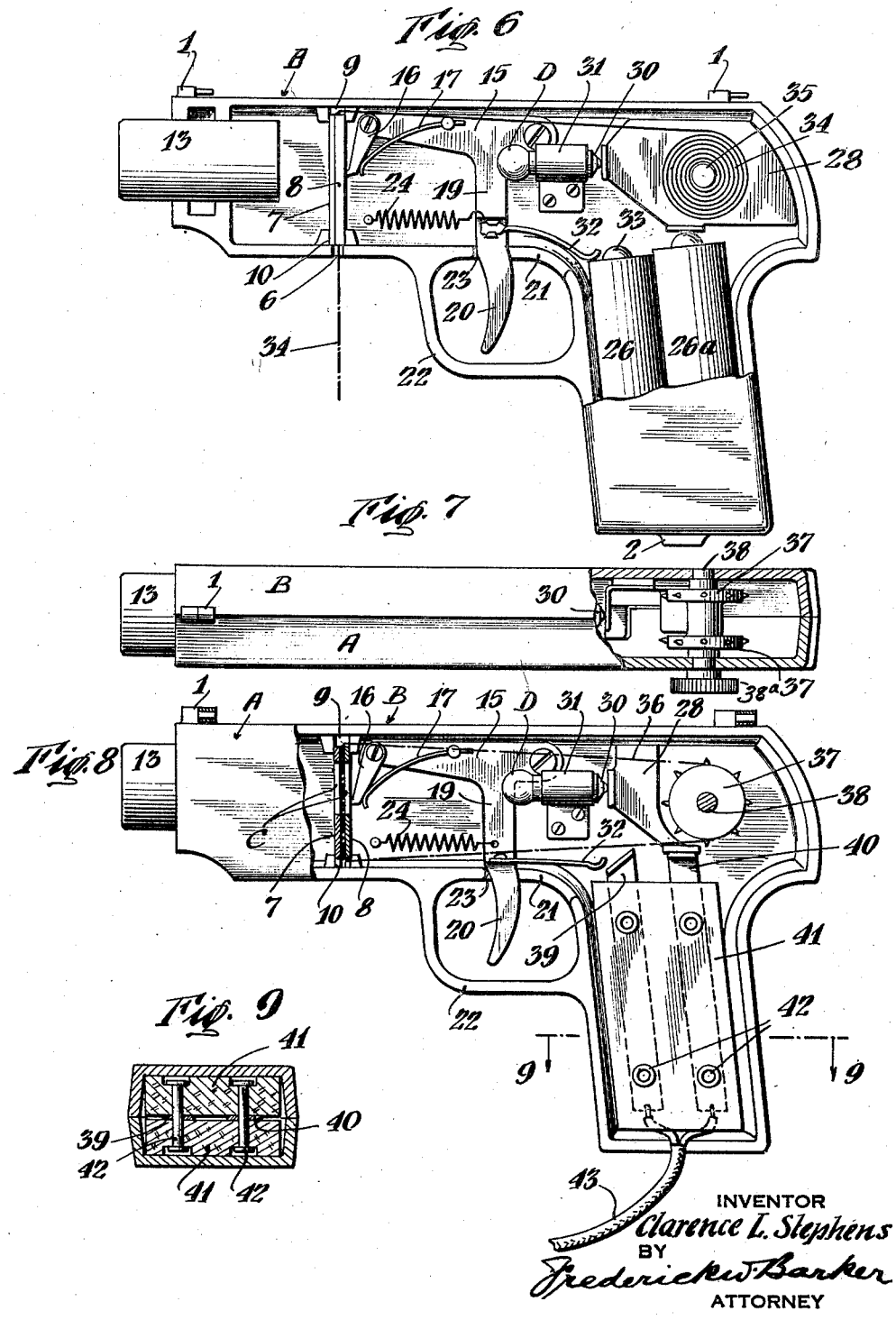

Patented Feb. 7, 1939

2,146,237

UNITED STATES PATENT OFFICE

2,146,237

PICTURE PROJECTING DEVICE

Clarence L. Stephens, Bayside, N. Y., assignor to Stephens Products Co., Inc., New York, N. Y., a corporation of New York Application August 2, 1937, Serial No. 156,899

10 Claims. (Cl. 88—28)

This application, which is a continuation in part of my application Serial No. 84,109, filed June 8, 1936, that matured into Patent No. 2,100,008 on November 23, 1937, relates to devices adapted for the projection of successive pictures from a film strip for exposure on any suitable remote surface, and my invention includes the provision of means for creating and passing a light beam through an adjusted film portion and through lenses for projected picture enlargement, together with co-ordinated means for flashing the light beam when the film is advanced to a set position.

While not so limited, my improved device may have a holder in the form of a toy pistol which serves as a support for a movable member operatively connected with means for shifting the film, in successive steps, into the path of the light beam, and for closing an electrical circuit to energize illuminating means which provides the light beam.

In my aforesaid application I have disclosed a pistol shaped holder in which a slidable bar was mounted for restricted reciprocation by a trigger. A pawl secured to said bar was adapted to advance an endless film in steps to position successive, equi-spaced pictures on the film for projection through a projection aperture. The slidable bar was spring retracted, and carried a contact member to close an electrical circuit through a light bulb at the end of its throw and project the picture positioned before the said aperture.

In the present embodiment of my invention a pivoted member is employed in place of said slidable bar, said member being operated by a trigger and carrying a pawl to engage and advance a film, means being provided to limit the movement of said member. Said pivoted member also carries a contact which closes an electric circuit through a light bulb at the end of its throw.

Other features and advantages of my invention will hereinafter appear.

In the drawings:—

Figure 1 is a side elevation of my improved projection device, in the form of a pistol, certain parts being in section and part of the holder being omitted to reveal internal structure.

Fig. 2 is a section on the line 2—2 of Fig. 1.

Fig. 3 is a horizontal central sectional view through the barrel portion.

Fig. 4 is a fragmentary side view, showing a modification wherein the film strip is received into a container located on a side of the device opposite the side carrying the delivery container.

Fig. 5 is an enlarged, exploded view showing in perspective the elements of the film guide.

Fig. 6 is a side elevation of a modification wherein the film strip is mounted in a coil in the device and passes out therefrom after leaving the guide.

Fig. 7 is a top plan view, partly in horizontal section, of another embodiment of my invention comprising means for supporting an endless film strip.

Fig. 8 is a side view, partly broken away, of the embodiment depicted in Fig. 7, and also showing the use of insulated contact strips for connecting the light bulb with an external source of electrical current, and Fig. 9 is a section on the line 9—9 of Fig. 8.

In these several views I have shown my invention, for example, in the form of a two-part pistol, wherein the characters A, B respectively, indicate the complementary half parts of the pistol each having a handle portion and a barrel portion, these portions being hinged together as at I along the barrel, and being provided at the butt end of the handle with catch engaging means 2.

Thus for loading and other purposes the members A and B can be unlatched and swung apart. The hinges I are elevated and aligned, and may serve as a sighting means.

Dealing first with the form of my invention illustrated in Figs. 1 to 5, there appears mounted on the part B of the pistol, at its barrel portion, a delivery container 3 for a coil of film 4, and slots 5 and 6 formed in both barrel parts A and B permit film from said container to pass transversely therethrough. A guide, composed of the plate members 7 and 8, fitted in opposite recesses 9 and 10, formed in the barrel portions, directs the passage of the film, plate member 8 having a groove 11 for this purpose.

The plate members 7 and 8 are provided with aligned, squared openings C forming a projection aperture through which successive pictures on the film may be projected. Also one of the plate members is provided with a vertical slot 12, intended for a purpose to be referred to hereinafter.

An objective lens comprising a tube 13 and lenses 14, is fitted and slidably secured in the muzzle portion of the barrel in advance of that portion of the film lying between the squared openings C, so that a bulb D which is positioned behind that portion of the film, is adapted, when energized, to direct its light beam through the squared openings C and the objective lens and thus to project a picture upon a more or less distant surface.

A movable member in the form of a bell-crank is pivoted at 14a to the wall of pistol part B, one arm 15 of said bell-crank extending horizontally and carrying a pivotal pawl 16 that is urged by a spring 17, extending from arm 15, into slot 12, where it will engage one of the series of holes 18 provided along a margin of the film strip 4, (see Fig. 5).

The other arm 19 of the bell-crank depends and continues into a trigger-like formation 20, which extends through a slot 21 formed in the part B, and depends within a guard 22.

The forward edge 23 of slot 21 serves as a stop to hold the bell-crank, under the tension of a spring 24, in its inert position, with the pawl 16 lodged in a hole 18 of the film, so that when finger pressure is applied to the trigger to draw it backwardly, thereby the pawl 16 will be caused to advance the film one step, to bring a succeeding picture before the projection aperture. Upon release of the trigger the bell-crank is retracted by said spring 24 which is secured at one end to the frame and at its other end to arm 19 causing the pawl to slip out of its engaged hole and to find engagement with the next succeeding hole.

To prevent the pawl 16 from carrying the film with it in its backward movement, I provide a spring E located in a slot F in plate 8 of the film guide, said spring serving to frictionally hold the film while the pawl is being drawn back, (see Fig. 5).

In a modification appearing in Fig. 4 the film is shown as collected in a receiving container 25 that is secured to the underside of the barrel.

As means for energizing the illuminating means D, I have shown in Figs. 1 and 3 a pair of dry cells 26 and 26a located, in series relation, in the pistol handle, the lower terminals of said cells engaging a spring connector 27 which is insulated from the parts A and B. The upper terminal of cell 26a engages a conductor 28 that is secured to but insulated from the pistol part B by insulation 29, said conductor 28 also being in contact with the center terminal 30 of bulb D and forming one conductor of a circuit connecting the bulb D with the batteries 26 and 26a. Bulb D is secured to a wall of the pistol by a clip 31 which makes contact with the other terminal of bulb D. The pistol frame may be made of conductive material such as metal to constitute the other conductor of said circuit. To close and open this circuit I provide a spring finger 32, carried by arm 19 of the bell-crank, said finger being adapted, in the operative movement of the bell-crank, at the end of the trigger stroke, to make contact with the terminal 33 of cell 26, whereupon a light beam will pass from the bulb D through the openings C and the lens system, to project a picture on the portion of the film positioned in said openings from the device.

In Figs. 6 to 9, showing modifications, particularly with respect to film disposal and feed, the same reference characters are employed for parts like those of Figs. 1 to 5.

Thus, in Fig. 6 the film 34 appears in the form of a coil or roll, mounted on the core or shaft 35 that is journalled in the rearward portion of the pistol barrel. The film from the coil is led forwardly to the guide and passes through the plates 7, 8 thereof in the same manner as indicated in Fig. 1, excepting that the film enters the guide from within the barrel, passing out through the barrel slot 6. A relatively large quantity of film can be provided in this roll or coil form.

In Figs. 7 and 8 the film appears in the form of an endless strip 36 which is mounted by its marginal holes on the teeth of a sprocket 37, carried by a shaft 38 journalled in the walls of parts A and B. In the drawings two sprockets are shown, to engage respectively in holes at opposite sides of the film strip, but obviously a single sprocket, with teeth engaging holes in one side of the film will answer the purpose. The knurled knob 38a on shaft 38 may serve for the manual operation of film strip 36.

The film 36 is passed between the guide plates and is moved in steps or stages past the openings C in the manner previously described.

In Fig. 8 also a pair of contact strips 39 and 40 are shown in place of the dry cells, the strip 40 being in contact with conductor 28, and the strip 39 adapted to be contacted by conductive finger 32.

The strips 39 and 40 are encased between plates 41 of non-conductive material and are clamped therebetween by the eyelet studs 42 (see Fig. 9). Said strips are engaged respectively by the opposite terminals of a cable 43 which is adapted to have contact with a suitable source of electrical energy, such for example as the battery of a flash light.

It will be apparent from the foregoing description that in the various embodiments of the invention disclosed herein, each movement of the trigger from its normal position to the end of its stroke and back to starting or normal position causes a number of operations to be performed including closing the circuit to illuminate the light bulb D and project the picture positioned for projection through the aperture C, opening the circuit, and shifting the film to position another picture for projection through the aperture.

Although the invention has been described in connection with certain specific embodiments thereof, it is to be understood that these are illustrations of the invention and are not to be considered as limiting the scope thereof. Variations and modifications in structure and arrangement of the parts may be made without departing from the present invention, and I hereby reserve the right to such variations and modifications of construction as will be comprised within equivalent mechanism and that will accomplish practically what I have set forth.

I claim:—

1. Picture projecting means comprising a gun-shaped holder, a film strip bearing a succession of pictures, means carried by the holder for supporting said strip, means in the holder providing a picture aperture, a movable member having operating trigger means, film engaging means borne by said member to shift said strip and bring successive pictures into projecting position before said aperture, illuminating means supported by the holder for illuminating the film at the aperture, a source of current for said illuminating means, switching means operable by the movable member, and a projecting lens in optical alignment with said picture aperture and supported by said holder whereby the image of a picture is projected when said trigger means is operated.

2. Picture projecting means comprising a gun-shaped holder, a film strip bearing a succession of pictures and having a series of marginal perforations, means carried by the holder for supporting said strip, means in the holder providing a picture aperture, a movable member having operating trigger means, film engaging means borne by said member to engage said perforations and shift said strip to bring successive pictures into projecting position before said aperture, illuminating means supported by the holder for illuminating the film at the aperture, a source of current for said illuminating means, switching means operable by the movable member, and a projecting lens in optical alignment with said picture aperture and supported by said holder whereby the image of a picture is projected when said trigger means is operated.

3. The subject matter of claim 1 wherein the holder is provided with means for limiting the movement of the movable member when a picture is in projecting position at said aperture.

4. The subject matter of claim 1 characterized by the provision of tension means in the holder engaging said film strip and serving to hold the same when the film engaging means is returned to its normal position.

5. The subject matter of claim 1 characterized by the provision of a spring-tensioned pawl carried by said member for engagement with the strip.

6. A picture projecting device comprising a gun-shaped holder having a projection aperture, a film bearing a succession of pictures, means carried by the holder for supporting said film with a portion thereof positioned for projection through said aperture, a pivoted member operatively connected with a trigger, film advancing means operatively connected with said pivoted member to shift said film and position successive portions thereof for projection through said aperture with each operation of said trigger, a light bulb mounted within said holder, a circuit adapted to connect said light bulb with a source of current, means to close and open said circuit with each operation of said trigger whereby each operation of the trigger closes the circuit and illuminates the light bulb to project a picture, opens the circuit and positions another portion of the film for projection.

7. A picture projecting device comprising a holder adapted to be held in the hand of the user, said holder having a projection aperture, a film bearing a succession of pictures, means carried by the holder for supporting said film with a portion thereof positioned for projection through said aperture, a manual operating member movably mounted on said holder, film advancing means operatively connected with said member to shift said film to position successive pictures for projection through said aperture, an electric light bulb supported by the holder in position for illuminating that portion of the film positioned at the aperture, a circuit adapted to connect said light bulb with a source of current, means for closing said circuit and illuminating said light bulb to project the picture on the portion of the film positioned for projection through said aperture when said manual operating member is actuated, and a projecting lens in optical alignment with said picture aperture and supported by said holder whereby the image of a picture on the portion of the film positioned for projection through said aperture is projected from the device and a different picture is positioned for projection each time said manual operating member is operated.

8. A picture projecting device comprising a pistol shaped holder having a handle and a barrel portion, said barrel portion having a projection aperture adjacent to its forward end, an objective lens mounted in the barrel portion in advance of said aperture, front and rear guides in said barrel portion adapted to support an endless film, an electric light bulb mounted in said barrel portion intermediate said guides, a pivoted member mounted in said holder with one end extending outside the holder through a slot therein and constituting a trigger, the other end of said pivoted member having means thereon adapted to engage perforations in said film, a dry cell in said handle portion, a normally open circuit connecting said dry cell with said light bulb, and means operated by said trigger for closing said circuit each time the trigger is pulled, whereby each operation of the trigger shifts the film to position a different picture for projection, closes the circuit to illuminate the light bulb and project the picture so positioned, and thereafter opens the circuit.

9. A picture projecting device comprising a gun shaped holder having a handle and a barrel portion, said barrel portion having a projection aperture adjacent to its forward end, an objective lens mounted in the barrel portion in advance of said aperture, means carried by said holder adapted to support a strip of film, a guide in said barrel portion adapted to position a portion of said film in alignment with said aperture, an electric light bulb mounted in said barrel portion in position to illuminate the said positioned portion of the film, a movable member mounted in said holder with a portion extending outside the holder through a slot therein and constituting a trigger, the inner portion of said member having means thereon adapted to engage perforations in said film, a circuit adapted to connect said light bulb with a source of current, and means for closing said circuit to illuminate said light bulb and project the picture positioned before the aperture each time the trigger is pulled, whereby each operation of the trigger shifts the film to position a different picture for projection.

10. A picture projecting device comprising a holder adapted to be held in the hand of the user, said holder having a projection aperture, means carried by said holder adapted to support a roll of film bearing a succession of pictures, a guide in said holder for supporting a portion of said film in position for projection through said aperture, a manual operating member movably mounted on said holder, film advancing means operatively connected with said member to shift said film to position successive pictures for projection through said aperture, an electric light bulb supported by the holder in position for illuminating that portion of the film positioned at the aperture, a circuit adapted to connect said light bulb with a source of current, means for closing said circuit and illuminating said light bulb to project the picture on the portion of the film positioned for projection through said aperture when said manual operating member is actuated, and a projecting lens in optical alignment with said picture aperture and supported by said holder whereby the image of a picture on the portion of the film positioned for projection through said aperture is projected from the device and a different picture is positioned for projection each time said manual operating member is operated.

CLARENCE L. STEPHENS.

Disclaimer 2,146,237.—*Clarence L. Stephens*, Bayside, N. Y. PICTURE PROJECTING DEVICE.
  Patent dated Feb. 7, 1939. Disclaimer filed Aug. 13, 1951, by the assignee, *Stephens Products Co., Inc.*
  Hereby enters this disclaimer to claim 7 of said patent.
  [*Official Gazette September 11, 1951.*]